United States Patent [19]

Augis et al.

[11] 4,124,324
[45] Nov. 7, 1978

[54] MODULAR CABLE TRENCH SYSTEM

[75] Inventors: John M. Augis; Victor J. Buehlman, both of San Jose, Calif.

[73] Assignee: Indian Head Inc., New York, N.Y.

[21] Appl. No.: 869,674

[22] Filed: Jan. 16, 1978

[51] Int. Cl.² ............................................. E01C 11/22
[52] U.S. Cl. .......................................... 404/3; 52/20; 52/220; 404/25
[58] Field of Search ................. 404/3, 2, 4, 5; 52/20, 52/19, 21, 220

[56] References Cited

U.S. PATENT DOCUMENTS

| | | | |
|---|---|---|---|
| 329,344 | 10/1885 | Sutton | 404/3 |
| 329,887 | 11/1885 | Caples | 404/3 |
| 358,778 | 3/1887 | Holt | 404/3 |
| 1,406,068 | 2/1922 | Padge | 404/4 |
| 2,518,620 | 8/1950 | Hughes | 404/4 X |
| 2,701,027 | 2/1955 | Scoville | 404/4 X |
| 3,196,764 | 7/1965 | Greider | 404/3 |
| 3,562,969 | 2/1971 | Little | 404/4 X |

Primary Examiner—Nile C. Byers, Jr.
Attorney, Agent, or Firm—William R. Laney

[57] ABSTRACT

A modular cable trench system for receiving cable in a trench excavated in the earth. The system includes one or more tee and/or channel elements of lightweight modular construction, with each of the molded modular units including a bottom frame and opposed side plates secured to opposite side edges of the bottom frame with both side plates and bottom frame molded of lightweight material. Transverse reinforcing elements extend between the side plates at ends of the bottom frame and are molded integrally with the side plates and bottom frame. The geometric configuration of the bottom frame and transverse reinforcing elements is selected to minimize the weight of each modular unit. A removable cover plate engages the upper edges of the side plates in each unit.

21 Claims, 3 Drawing Figures

U.S. Patent     Nov. 7, 1978     4,124,324
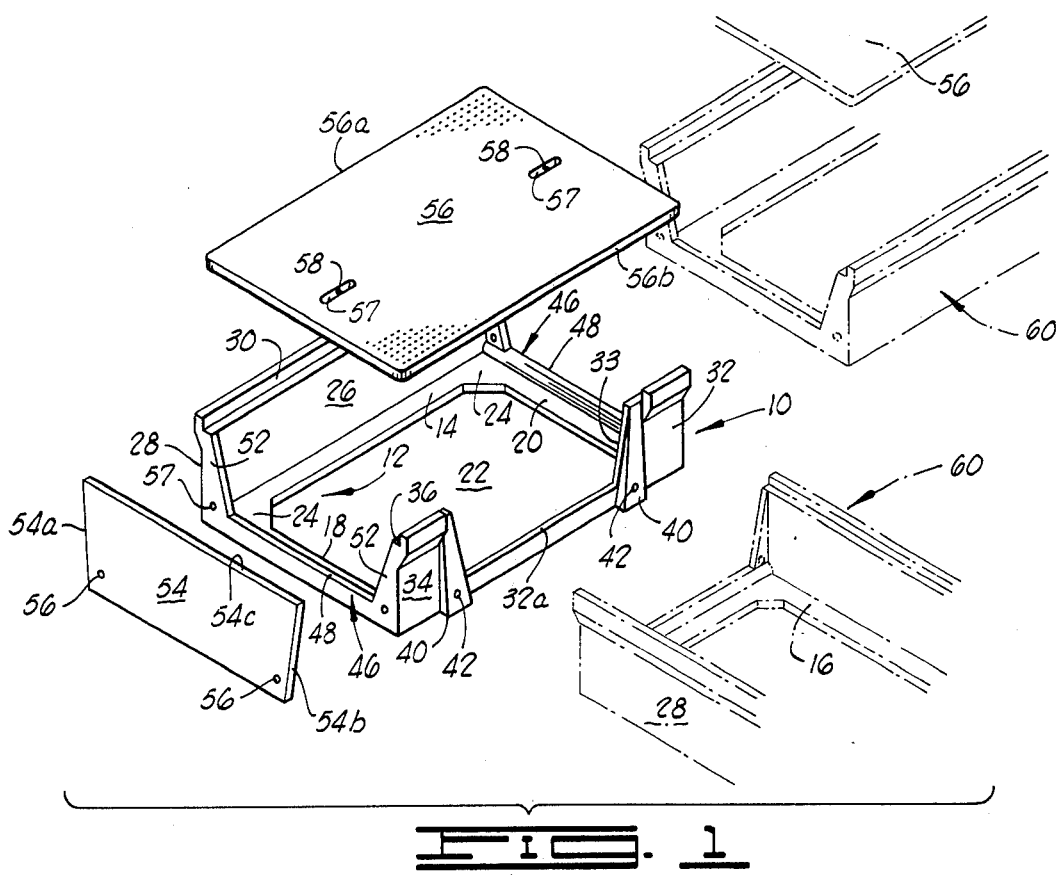
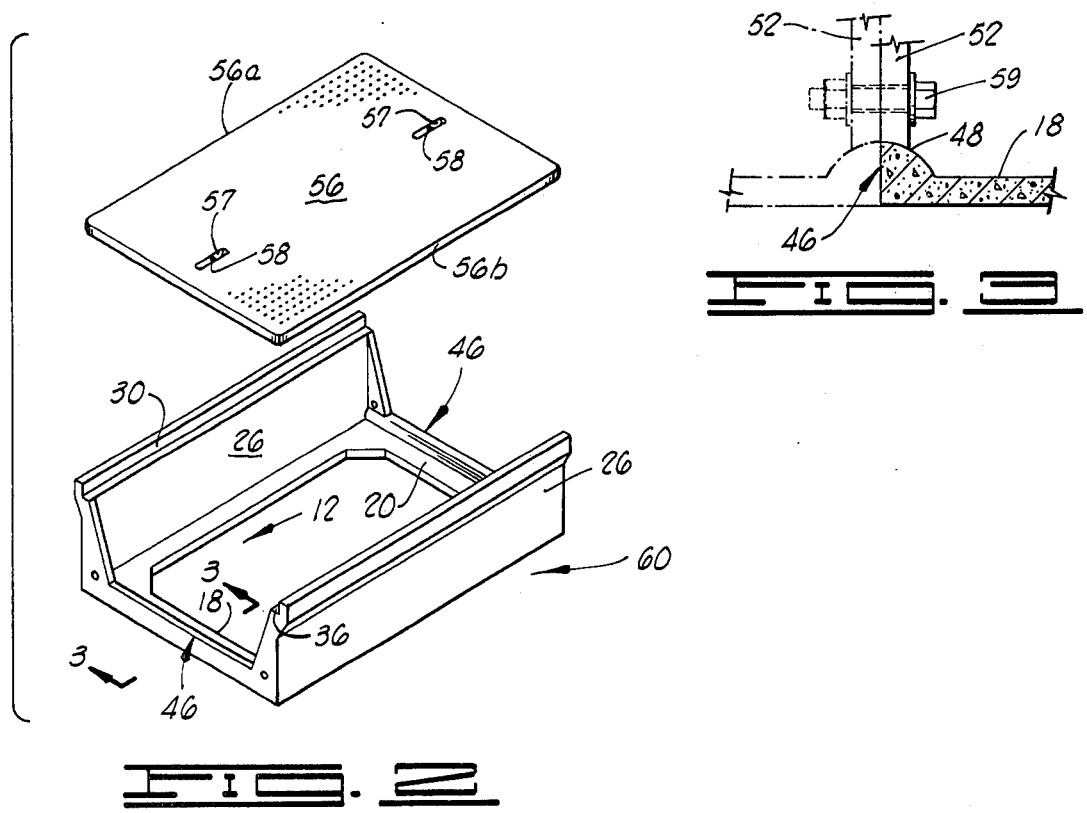

MODULAR CABLE TRENCH SYSTEM

BACKGROUND OF THE INVENTION

1. Field of the Invention

This invention relates to cable trenches and ducts adapted to be placed in an excavation in the earth for the purpose of receiving, directing and protecting electrical cables and conduits laid therein.

2. Brief Description of the Prior Art

It has become a fairly widespread practice in the electrical utility industry to place various power cables for power transmission at subterranean locations and, in many instances, in lined trenches excavated in the earth adjacent the surface. In one widely accepted form of cable duct or trench construction, following the excavation of a trench in the earth to carry the system between a source of origination of the cables and their destination, the earthen trench is lined with a concrete structure which is in the form of a series of interconnected concrete or masonry walls which function to prevent caving or sloughing of the earth forming the sides of the trench and further function to support rigid covers or top plates which are at ground level and can function, when laid end to end in abutting relation, as a walkway or the like. The cover plates as thus provided can be removed when it is necessary to repair, maintain or replace the cables which are laid between the concrete or masonry walls. A system of this type is illustrated and described in U.S. Pat. No. 2,862,237.

Concrete or masonry duct systems of the type described have generally functioned relatively well under conditions of the normal extremes of temperature encountered in seasonal changes characteristic of the United States. The concrete or mortar elements are, however, heavy and, moreover, the manner of assembly of the trench ducting requires interfitting of separate elements required to support and maintain the wall sections in position and in alignment with each other. Moreover, in situations of extreme cold, the concrete may undergo cracking or fracturing.

BRIEF DESCRIPTION OF THE PRESENT INVENTION

The present invention provides an improved modular cable trench system made up of a plurality of molded lightweight units which can be interconnected for purposes of directional or grade changes, and can be placed in a pre-excavated trench by a minimum number of personnel with a quickness and ease not characteristic of prior systems of this type.

Broadly described, the modular cable trench system of the invention comprises one or more tee or channel elements or units of lightweight, modular construction, with each of the units including a bottom frame and opposed side plates secured to opposite side edges of the bottom frame. Both the side plates and bottom frame are molded of lightweight material. Transverse reinforcing elements extend between the side plates at the ends of the bottom frame, and are molded integrally with the side plates and bottom frame. The geometric configuration of the bottom frame and transverse reinforcing elements is selected to minimize the weight of each modular unit. Thus, the bottom frame is open at its center and the transverse reinforcing elements define openings at opposite sides of the unit. A removable cover plate engages the upper edges of the side plates in each unit. The modular cable trench system as thus constructed provides the advantage of being lightweight in construction and susceptible to placement in a pre-excavated trench in the earth by manual means utilizing two men and without any requirement for winches, cranes or power tools.

An additional object of the invention is to provide an improved modular cable trench system in which the components of the system are self-contained and include upstanding walls which are supported rigidly in each unit and resist sloughing or caving of the earth adjacent the units when they are placed in a pre-excavated trench.

An additional object of the invention is to provide a modular cable trench system comprising a plurality of lightweight, modular units of molded construction which can be attached to each other in a variety of configurations to form a blind end, a right angle bend through a tee section, or a three-piece section in which the course of the cable receiving elements extending in one direction intersect another course of cable receiving elements at a right angle.

A further object of the present invention is to provide a modular cable trench system which can be easily adapted to emplacement in a trench excavated in the earth and extending up an incline or grade, with the units of the cable trench system interfitting and providing an integrated channel of high integrity over the full extent of the grade.

Another object of the present invention is to provide a modular cable trench system which is made up of a series of self-contained molded units which can be placed in a prepared earthen trench without the necessity for further working and assembling of the units, other than connection to each other to form the desired length of trench, and without the requirement for any heavy equipment to effect the emplacement.

A further object of the invention is to provide a modular cable trench system comprised of a plurality of units constructed of a material which combines exceptional strength and rigidity with minimum weight.

Another object of the invention is to provide a modular cable trench assembly which includes removable cover plates positioned over supporting units, with the cover plates at ground level and possessing sufficient strength to function as a walkway and to support light vehicular traffic.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 depicts an exploded or separated view of a modular tee unit forming a part of the modular cable trench system of the invention. There are also illustrated in FIG. 1 in phantom lines, a pair of modular channel units which are used in conjunction with the tee unit.

FIG. 2 is a view similar to FIG. 1 but illustrating, in exploded or separated form, and in perspective, one of the modular channel units of the invention.

FIG. 3 is a sectional view taken along line 3—3 of FIG. 2 and illustrating in dashed lines, structure which is joined by bolting to that shown in FIG. 3 in assembling the modular units of the invention.

DETAILED DESCRIPTION OF A PREFERRED EMBODIMENT OF THE INVENTION

Referring to the drawings, a modular cable trench system of the invention generally includes two basic modular units which are illustrated in FIGS. 1 and 2. In FIG. 1, there is shown a tee unit, designated generally by reference numeral 10, which modular unit may function either as a tee connection, or for forming a 90° bend in a cable trench constructed of interconnected modular units of the invention in a manner hereinafter described. In FIG. 2, a modular channel unit is illustrated and is designated generally by reference numeral 60. The channel units 60 and tee units 10 can be interconnected in various configurations, some of which will be hereinafter described, and when so interconnected, form the modular cable trench system of the invention for the purpose of accommodating electrical cables and conduits extended through various courses between predetermined locations.

Referring to FIG. 1, the tee modular unit 10 of the invention includes a bottom frame 12 which extends in a substantially horizontal plane as the tee unit is conventionally employed. The bottom frame 12 may be said to have a pair of opposed, substantially parallel side portions 14 and 16 and a pair of opposed, substantially parallel end portions 18 and 20, with the side and end portions interconnected to form the generally rectangular frame having a large opening 22 in the center thereof. It will be noted that at each of the corners of the bottom frame 12, a generally triangular shaped corner plate 24 is provided for the purpose of interconnecting the respective side portion 14 or 16 with the respective end portion 18 or 20.

Projecting upwardly from the outer edge of the side portion 14 is a side plate 26. The side plate 26 has an outer surface 28 which inclines slightly with respect to the vertical so that the upper portion of the side plate 26 is located outwardly with respect to the bottom frame 12. Near its upper edge, the side plate 26 is angled sharply outwardly to increase its thickness, and to permit an elongated relief defining an angle of 90° to be formed in the upper edge portion of the side plate. It will be noted that the relief 30 extends from one end of the side plate 26 to the other.

At the opposite side of the tee unit 10 from the side plate 26, a side plate 32 projects upwardly from the outer edge of the side portion 16 and has its lower edge molded integrally with the side portion 16. Like the side plate 26, the side plate 32 has an outer surface 34 which inclines to the vertical so that the side plate 32 leans outwardly from its line of securement to the bottom frame 12. Also similarly to the construction of the side plate 26, the upper portion of the side plate 32 is thickened by an outward angulation so as to provide accommodation for a longitudinally extending, upwardly opening recess or relief 36 of right angular cross-sectional configuration.

It will be noted in referring to FIG. 1 that the central portion of the side plate 32 is cut away to provide a generally trapezoidally configured opening 33 which terminates at its lower side in a threshold or step portion 32a. The threshold or step portion 32a of the side plate 32 projects upwardly above the upper surface of the bottom frame 12.

In order to permit one of the modular channel units 60 to be secured to a side of the tee unit 10 in the manner hereinafter described, a pair of wedge-shaped tee attachment blocks 40 are provided. The tee attachment blocks 40 each taper from a relatively thick and wide lower end portion to a relatively narrow and thin upper end portion. The tee attachment blocks 40 are secured to the outer surface 34 of the side plate 32 adjacent the opening 33 by means of suitable bolts or screws extended through holes 42 formed in the thick base portion of each of the tee attachment blocks and aligned with holes formed at this location in the side plate 32. It will be noted, and will be better understood from the following description, that the function of the tee attachment blocks 40 is to compensate for the inclination with respect to the vertical of the side plate 32, and to provide a true vertical surface to which one of the modular channel units 60 can be attached in a manner hereinafter described.

At opposite ends of the modular tee unit 10, a pair of identical transverse reinforcing elements 46 are located. Each transverse reinforcing element 46 is secured to, and formed integrally with, the base frame 12 and the two side plates 26 and 32, and extends between opposed end edges of the two opposed side plates. Each transverse reinforcing element 46 includes a transversely extending step or threshold 48 which, as shown in FIGS. 1 and 3, has a quarter-round cross-sectional configuration. The outer side of each of the threshold members 48 is substantially flat or monoplanar in configuration, and merges with the flat outer surface of a pair of upwardly extending trapezoidally shaped legs 52. It will thus be seen that the legs 52 and threshold member 48 together form the transverse reinforcing element, a pair of which is located at opposite ends of the modular tee unit 10. The legs 52 of each transverse reinforcing element 46 are molded integrally with the respective side plates 26 and 32.

To facilitate closure of one or both ends of the modular tee unit 10, one of a pair of end plates 54 are provided and are shaped as illustrated in FIG. 1. Each end plate 54 is of trapezoidal configuration, having outer side edges 54a and 54b which are inclined to enable them to terminate flush with the outer surfaces 28 and 34 of the respective side plates 26 and 32. The end plates 54 each define a pair of bolt holes 56 in the lower outer corners thereof to facilitate attachment of the respective end plate to the adjacent transverse reinforcing element 46. Aligned holes 57 are formed through the lower portions of the legs 52 of each transverse reinforcing element 46, and facilitate attachment of an end plate 54 thereto, or interconnection of two units to each other by bolts 59 as shown in FIG. 3. The transverse dimension of each end plate 54 is such that when it is attached to its respective adjacent transverse reinforcing element 46, its upper edge 54c will terminate flush with the upper edges of the side plates 26 and 32. It may here be pointed out that the end plates 54 can also be used to terminate and close either end of one of the channel units 60 in substantially the same way as the end plates are used to close an end of one of the modular tee units 10. This adaptability of the end plates 54 will be better understood from the ensuing description of the modular channel units 60.

As a final element of structure which is used with the modular tee unit 10, a cover plate 56 is provided. The cover plate 56 is of rectangular configuration and is dimensioned to permit the opposite side edges 56a and 56b thereof to be received in, and accommodated by, the reliefs 30 and 36, respectively. When the cover plate 56 is lowered to the point where it rests upon the side plates 16 and 32 with its opposite longitudinal edges 56a and 56b resting in the reliefs 30 and 36, its upper surface is then flush with, or lies in the same plane as, the upper edges of the side plates 26 and 32. This construction thus allows the modular cable trench system, including the modular tee unit 10, to be placed at a depth in the earth such that the cover plate 56 is at ground level and forms a surface which can be used as a walkway. The cover plate 56 carries a pair of pull slots 57 and associated transverse bars 58 which enable the cover plate 56 to be quickly emplaced upon, or removed from, the supporting side plates 26 and 32 of the tee unit 10 at any time desired.

The second primary modular unit utilized in making up the modular cable trench system of the invention is the channel unit 60 illustrated in FIG. 2. The channel unit 60 is constructed very similarly to the modular tee unit 10 and for this reason, identical reference numerals will be used in alluding to parts which are, in fact, identical to the corresponding parts used in the construction of the tee unit. Thus, the bottom frame 12 employed in both modular units is identical in both units. The side plates 26 are also identical and, in the case of the channel unit 60, two of such side plates are employed at opposite sides of the base frame 12, in lieu of the utilization of the centrally opened side plate 32 employed in the tee unit. Like the tee unit 10, the channel unit 60 includes a pair of opposed, substantially parallel transverse reinforcing elements 46 located in the opposite ends of the bottom frame 12 and extending between the side walls 26 of the channel unit. The transverse reinforcing elements 46 are constructed identically to that previously described as employed at opposite ends of the tee unit 10. Also similarly to the construction of the tee unit, the transverse reinforcing elements 46 are molded integrally with the side plates 26 and the bottom frame 12. A cover plate 56 identical in construction to the cover plate previously described as used upon the tee unit 10 is provided for closing the open upper side of the channel unit 60. As has been previously pointed out, the end plates 54 which have been described can be used interchangeably for closing one or more ends of either the tee unit 10 or the channel unit 60.

USE AND OPERATION OF THE INVENTION

In using the modular cable trench system of the invention, the installing crew must initially, of course, determine the course of the cable or electrical conduit from its point of origination to its point of destination. Such course may be a relatively straight line, or it may involve one or more right angle bends. In either event, the required course can be accommodated by the modular cable trench system of the invention.

After the course to be followed by the cable has been determined, appropriate excavation is made in conventional fashion, using a backhoe or other suitable excavating apparatus. The trench normally will be rather shallow and, in general, is made of a depth which corresponds to the height of the several side plates 26 and 32 which form parts of the tee units and channel units of the system of the invention. Typically, the height of the side plates and the corresponding depth of the trench should be about 12 inches.

After the trench has been excavated with a depth sufficient to accommodate the side to side dimension of the tee and channel units, a crew of only two men can install these units in a configuration which conforms to that of the excavated trench. Where a straight run is followed by the trench over a substantial distance, a plurality of the channel units 60 will be laid end to end with the bottom frame 12 of each resting upon the bottom of the trench. The channel units 60 are connected to each other by extending suitable bolts through aligned holes formed in the trapezoidally shaped leg portions of each of the transverse reinforcing elements located at opposite ends of each channel unit. In other words, when the channel units 60 are abutted in end to end relation, the transverse reinforcing elements 46 of each are also in flatly abutting contact with each other, and can then be interlocked by means of suitable bolts extended through the aligned apertures in the transverse reinforcing elements.

When a right angle turn is to be made, one of the modular tee units 10 is connected to the last channel unit 60 in the straight run prior to encountering the 90° turn in the excavation. Connection is made by abutting the transverse reinforcing element 46 at one end of one of the modular tee units 10 against a transverse reinforcing element 46 carried on the unconnected end of the last channel unit 60 in the straight course. Connection is effected in a way which will cause the central opening 33 in the side plate 32 of the tee unit 10 to be facing toward that portion of the excavated trench which extends at a right angle to the first portion of the trench which is already predominantly occupied by the interconnected channel units. With the opening 33 in the side plate 32 of the tee unit 10 thus facing the intersecting leg of the excavation, another channel unit 60 is connected to the tee unit 10. This connection entails first positioning a pair of the tee attachment blocks 40 against the outer surface 34 of the side plate 32 of the tee unit to provide a vertical surface against which the vertically extending outer face of the transverse reinforcing element 46 of the channel unit 60 to be attached to the tee unit can flatly abut. With the tee attachment blocks 40 placed in position, bolts are then extended through aligned apertures in the transverse reinforcing element 46 of the adjacent, next-to-be-connected channel unit 60, the intervening tee attachment blocks 40 and the adjacent side plate 32 of the tee unit 10. Similar changes of direction through 90° can be accomplished wherever necessary to complete the geometric configuration of the modular cable trench system which is needed to accommodate and convey the electrical cables from a point of origination to a distal point.

After several tee units 10 and/or channel units 60 are interconnected as required, the cable is laid in the earthen trench lined with several interconnected units by placing them across the thresholds or steps 48 of the transverse reinforcing elements 46, and extending them across the bottom frames 12 of the respective units. When the cable has thus been laid into the modular cable trench system of the invention, the cover plates 56 can be placed in position at the upper side of each of the units so that the opposed longitudinal edges 56a and 56b of each cover plate rest upon side plates of the underlying unit. It will be noted that the cover plates 56 are of lengths which are precisely equal to the length of each of the modular tee and channel units 10 and 60 so that when the cover plates are in position, they form a continuous walkway which conforms to the course followed by the underlying, interconnected modular units.

The modular tee units 10 and modular channel units 60 of the invention are of very lightweight construction and can be easily located, positioned and interconnected by only two workmen. The very lightweight character of each of the modular units is achieved by molding each of the units of a strong, lightweight material. Each modular unit is of a sandwich-type construction in which a very lightweight modulable materal is positioned between a pair of liners. The liners are constructed of fiberglass in the form of woven roving. The core or internal material between the fiberglass external liners is a molded mixture of from about 40 to 45 weight percent of coarse aquarium sand, from about 30 to 35 weight percent of a coarser blend of sand and from about 14 to 18 weight percent of a polyester resin. The sands and polyester resin are thoroughly mixed, and a catalytic agent is then added to initiate cure of the resin. While the mixture is still in the liquid state, the mixture is poured into fiberglass lined molds to form the various components of the system.

It will be noted that each of the units as thus fabricated is much lighter than concrete, or even than concrete containing a substantial portion of fibrous material. Each unit is self-contained and is constructed to be lightweight by reason of the open bottom frame thereof. The transverse reinforcing elements, however, impart high mechanical strength to each unit, and permit the elimination of any need for U-shaped wall supporting members which must be installed separately from each of the modular units. Once in place, the matter of mechanical interconnection of the several modular units is very simple.

Although a preferred embodiment of the invention has been herein described in order to provide a sufficient illustrative example of the invention to enable its practice by those skilled in the art, it will be understood that various changes and innovations can be made in the described and illustrated structure without departure from such basic principles. Changes and innovations of this type are therefore deemed to be circumscribed by the spirit and scope of the invention, except as the same may be necessarily limited by the appended claims, or reasonable equivalents thereof.

What is claimed is:

1. A modular cable trench system comprising:
  a plurality of interconnected modular units each including
    a centrally opened bottom frame of substantially rectangular configuration;
    a pair of opposed side plates connected to opposite side edges of said bottom frame and each including end edges at opposite ends thereof; and
    a pair of transverse reinforcing elements interconnecting said side plates at opposite ends of said bottom frame, said reinforcing elements each including a transverse step formed integrally with said bottom frame and further including a pair of legs joined to said step at opposite ends thereof, each of said legs secured to an end edge of one of said side plates.

2. A modular cable trench system as defined in claim 1 wherein at least one of said modular units is a tee unit and one of said side walls of each of said tee units is centrally relieved to provide a trapezoidally shaped central opening terminating at a step portion of the centrally relieved side wall secured to and projecting from said bottom frame.

3. A modular cable trench system as defined in claim 1 and further characterized as including a cover plate covering each of said units and positioned in abutting relation to each other to form a walkway along the top of said modular cable trench system.

4. A modular cable trench system as defined in claim 1 and further characterized as including a pair of end plates each secured to one of the transverse reinforcing elements of each one of two of said modular units to form closed ends at opposite ends of said interconnected modular units.

5. A modular cable trench system as defined in claim 3 wherein each of said side plates is of substantially rectangular configuration and includes a first edge secured to a side edge of said bottom frame and a second edge defining an elongated relief, said reliefs in the opposed side plates of each unit receiving edges of one of said cover plates.

6. A modular cable trench system as defined in claim 2 wherein at least one of said modular units is a channel unit in which each of the side plates thereof is identical to the other side plate, and wherein said system is further characterized as including a pair of tee attachment blocks positioned between said channel unit and tee unit and interconnecting said channel unit to said tee unit at the location of said trapezoidally shaped central opening.

7. A modular cable trench system as defined in claim 1 wherein each of said transverse steps is of quarter-round crosssectional configuration, and each of said legs is of trapezoidal configuration.

8. A modular cable trench system as defined in claim 1 wherein each of said modular units is a molded, self-contained unit of a mixture of sand and cured polyester resin sandwiched between layers of woven fiberglass roving.

9. A modular cable trench system as defined in claim 8 wherein each of said transverse steps is of quarter-round crosssectional configuration, and each of said legs is of trapezoidal configuration.

10. A modular cable trench system as defined in claim 9 wherein at least one of said modular units is a tee unit and one of said side walls of each of said tee units is centrally relieved to provide a trapezoidally shaped central opening terminating at a step portion of the centrally relieved side wall secured to and projecting from said bottom frame.

11. A modular cable trench system as defined in claim 9 and further characterized as including a cover plate covering each of said units and positioned in abutting relation to each other to form a walkway along the top of said modular cable trench system.

12. A modular cable trench system as defined in claim 9 and further characterized as including a pair of end plates each secured to one of the transverse reinforcing elements of each one of two of said modular units to form closed ends at opposite ends of said interconnected modular units.

13. A modular cable trench system as defined in claim 12 and further characterized as including a cover plate covering each of said units and positioned in abutting relation to each other to form a walkway along the top of said modular cable trench system.

14. A modular cable trench system as defined in claim 2 and further characterized as including a cover plate covering each of said units and positioned in abutting relation to each other to form a walkway along the top of said modular cable trench system.

15. A modular cable trench system as defined in claim 14 wherein each of said steps is of quarter-round crosssectional configuration, and each of said legs is of trapezoidal configuration.

16. A modular cable trench system as defined in claim 14 wherein each of said side plates is of substantially rectangular configuration and includes a first edge secured to a side edge of said bottom frame and a second edge defining an elongated relief, said reliefs in the opposed side plates of each unit receiving edges of one of said cover plates.

17. A modular cable trench system as defined in claim 16 wherein at least one of said modular units is a channel unit in which each of the side plates thereof is identical to the other side plate, and wherein said system is further characterized as including a pair of tee attachment blocks positioned between said channel unit and tee unit and interconnecting said channel unit to said tee unit at the location of said trapezoidally shaped central opening.

18. A modular cable system comprising:
a modular integrally molded tee unit including
 a centrally opened, horizontally extending bottom frame of substantially rectangular configuration;
 a pair of opposed, substantially parallel side plates of substantially rectangular configuration and each having an edge connected to an edge of said bottom frame, and each extending upwardly and outwardly from said bottom frame at an angle to the vertical, one of said side plates having an opening formed at a central location therein; and
 a pair of opposed, substantially parallel transverse reinforcing elements interconnecting and reinforcing said side plates and formed integrally therewith and with said bottom frame;
a modular, integrally molded channel unit connected to said tee unit and including:
 a centrally opened, horizontally extending bottom frame of substantially rectangular configuration;
 a pair of opposed, substantially parallel side plates of substantially rectangular configuration and each having an edge connected to an edge of said bottom frame, and each extending upwardly and outwardly from said bottom frame at an angle to the vertical; and
 a pair of opposed, substantially parallel transverse reinforcing elements interconnecting and reinforcing said side plates and formed integrally therewith and with said bottom frame; and
means connecting one of the transverse reinforcing elements of said channel unit to said one side plate of said tee unit with said channel unit side plates projecting on opposite sides of said opening centrally located in said one side plate of said tee unit.

19. A modular cable system as defined in claim 18 and further characterized as including a cover plate interfitted with, and extending between, each pair of opposed, substantially parallel side plates.

20. A modular cable system as defined in claim 19 and further characterized as including a trapezoidally shaped end plate secured to one of the transverse reinforcing elements of one of said units and covering an opening through said reinforcing element into said one unit.

21. A lightweight molded unit for use in forming a rigid trench for cable in an earth excavation comprising:
a bottom frame having opposed parallel side portions and opposed parallel end portions;
side plates projecting from the opposite side portions of said bottom frame and each defining a cover plate receiving relief at a side thereof opposite said bottom frame; and
a pair of transverse reinforcing elements interconnecting said side plates over opposite end portions of said bottom frame, said reinforcing elements each including a transverse step of quarter-round cross-sectional configuration adjacent said bottom frame, said bottom frame, transverse reinforcing elements and said plates being integrally molded.

* * * * *